United States Patent
Shetty

(10) Patent No.: US 12,554,754 B1
(45) Date of Patent: Feb. 17, 2026

(54) ARTIFICIAL INTELLIGENCE AGENT THROUGH VECTORIZING PREDICTED INPUTS

(71) Applicant: Airia LLC, Alpharetta, GA (US)

(72) Inventor: Rohit Pradeep Shetty, Bangalore (IN)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 18/946,885

(22) Filed: Nov. 13, 2024

(51) Int. Cl.
*G06F 16/00* (2019.01)
*G06F 16/3329* (2025.01)
*G06F 16/334* (2025.01)
*G06F 16/338* (2019.01)

(52) U.S. Cl.
CPC ...... *G06F 16/3329* (2019.01); *G06F 16/3347* (2019.01); *G06F 16/338* (2019.01)

(58) Field of Classification Search
CPC . G06F 16/3329; G06F 16/3347; G06F 16/338
USPC .......................................................... 707/728
See application file for complete search history.

(56) References Cited

U.S. PATENT DOCUMENTS

| | | | |
|---|---|---|---|
| 11,321,527 B1* | 5/2022 | Gopalarao | G06F 18/211 |
| 2024/0211504 A1* | 6/2024 | Jeong | G06N 20/20 |
| 2024/0345551 A1* | 10/2024 | Ramanasankaran | G06N 3/0895 |

FOREIGN PATENT DOCUMENTS

CN 118069815 A * 5/2024 ......... G06F 16/3329

* cited by examiner

*Primary Examiner* — Monica M Pyo
(74) *Attorney, Agent, or Firm* — Clayton, McKay & Bailey, PC

(57) ABSTRACT

The present invention provides a system for processing user queries through an artificial intelligence ("AI") pipeline, utilizing data chunking, question generation, and AI models to deliver contextually relevant responses. The system includes a server that ingests and chunks datasets, generates vector embeddings, and stores the data in one or more vector databases. A pipeline engine sends the chunked data to an AI model that generates potential questions tailored to different user personas. These questions, along with their corresponding data chunks, are stored in the database for future retrieval. When a user submits a query, the system semantically compares the query to the pre-generated question vectors and retrieves the most relevant question and associated data chunk. The query is then sent to an external AI model for final response generation. The system provides seamless interaction, delivering optimized, context-aware responses to user queries in real-time.

16 Claims, 9 Drawing Sheets

ARTIFICIAL INTELLIGENCE AGENT THROUGH VECTORIZING PREDICTED INPUTS

BACKGROUND

Artificial intelligence ("AI") pipelines, such as AI agents, have become increasingly popular in a wide range of applications, from natural language processing to image recognition. These pipelines often rely on datasets, allowing the AI system to generate responses based on datasets of interest to the user. However, users tend to frequently ask similar or repetitive questions based on the dataset. This behavior is particularly common in systems designed to handle general inquiries or provide responses to a set of predefined information.

The frequent repetition of similar queries or other types of inputs results in unnecessary processing within the AI pipeline. Each time a similar input is received, the system must reprocess the input and generate a response, which can include executing multiple pipeline objects, such as a vector search of the dataset and an AI service to analyze or format the results of the vector search. This can consume computing resources such as memory, central processing unit ("CPU") cycles, and token usage, all to arrive at the same result as for prior inputs. In systems that operate with a token-based architecture, where responses are metered by the number of tokens processed, this repetitive query behavior leads to inefficient use of available tokens, ultimately reducing the system's overall effectiveness.

In particular, the problem is exacerbated in AI pipelines that charge users based on the number of tokens consumed during interactions. When multiple users repeatedly ask similar questions or submit the same input, the AI model unnecessarily uses tokens for responses that have already been processed, leading to excess resource consumption and inflated costs. This situation not only wastes computational resources but also introduces latency in the system's responses, potentially degrading the user experience.

Additionally, some user queries may not semantically match appropriate content in a vector database search. Currently, no scalable method exists for anticipating this issue ahead of time. Instead, the user is left having to rephrase their query until they get adequate results. This is costly in both time and processing, since the same AI pipeline will need to execute repeatedly until the user finally receives adequate results.

There is, therefore, a need for a solution that can reduce the computational overhead associated with handling repetitive queries in AI pipelines, optimize the usage of tokens, and improve the overall efficiency of the system.

SUMMARY

Examples described herein include systems and methods for processing user queries in an AI pipeline, utilizing a combination of data chunking, vector embeddings, pre-generated questions, and third-party AI models to provide accurate, context-aware responses. The system is designed to manage large datasets by segmenting them into smaller, coherent chunks, generating potential user questions about those chunks, and storing both the chunked data and questions in a vectorized form for efficient retrieval. The system also supports user queries by semantically matching user input to pre-generated questions and sending the corresponding data chunk to an AI model for final response generation. This process ensures that users receive tailored, relevant answers based on the content of the dataset, improving the accuracy and efficiency of query handling. Semantically matching the pre-generated questions can be more accurate than attempting to directly semantically match a query against responsive content. In this way, additional intelligence can be built in up front before the query is even received by the user, such that the query is linked to a pre-generated question, which in turn is linked to one or more responsive data chunks.

The system can begin with the ingestion of a dataset by an AI pipeline execution engine on a server, which processes the dataset by dividing it into smaller, meaningful segments referred to as "chunks." The AI pipeline engine can include one or more processes executing on one or more servers of the AI platform, and is referred to herein as a pipeline engine as a shorthand convenience. The pipeline engine uses predefined chunking rules, such as token limits or semantic boundaries, to ensure each chunk represents a coherent unit of data. An embedding model is then applied to these chunks, generating vector embeddings that capture the semantic relationships within the data. These vectors, along with metadata, are stored in a vector database for subsequent retrieval and use.

Once the data has been chunked and vectorized, a pipeline engine sends each chunk to a query AI model, which is responsible for generating questions that various user types might ask about the content. These questions can be tailored to different personas, such as technical users, support users, or end users, ensuring that the system anticipates a wide range of possible queries. The generated questions are then vectorized and stored in the same or a separate vector database, along with their corresponding data chunks. This preemptive generation of questions enables faster response times during actual user interactions, as the system can match user queries with pre-generated content rather than generating responses on the fly.

When a user submits a query through an application interface on their device, the query is sent to the AT pipeline via an endpoint, where it is processed by the pipeline engine. The pipeline engine vectorizes the user input and compares it semantically to the vectorized pre-generated questions stored in the database. Using techniques like cosine similarity or other distance metrics, the system identifies the closest match between the user's query and the pre-generated questions. Once a match is found, the pipeline engine retrieves the corresponding data chunk associated with that question.

After retrieving the matching question and data chunk, the pipeline engine sends this information to an AI model. The AI model processes the input, using the question and chunk as context, and generates a detailed, contextually relevant response. The response is then sent back to the pipeline engine on the server, which forwards it to the application on the user's device for display. This seamless integration between the server, the AI pipeline, and external AI models allows the system to deliver high-quality responses in real-time, optimizing the user experience while maintaining flexibility and scalability.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Figure 1:
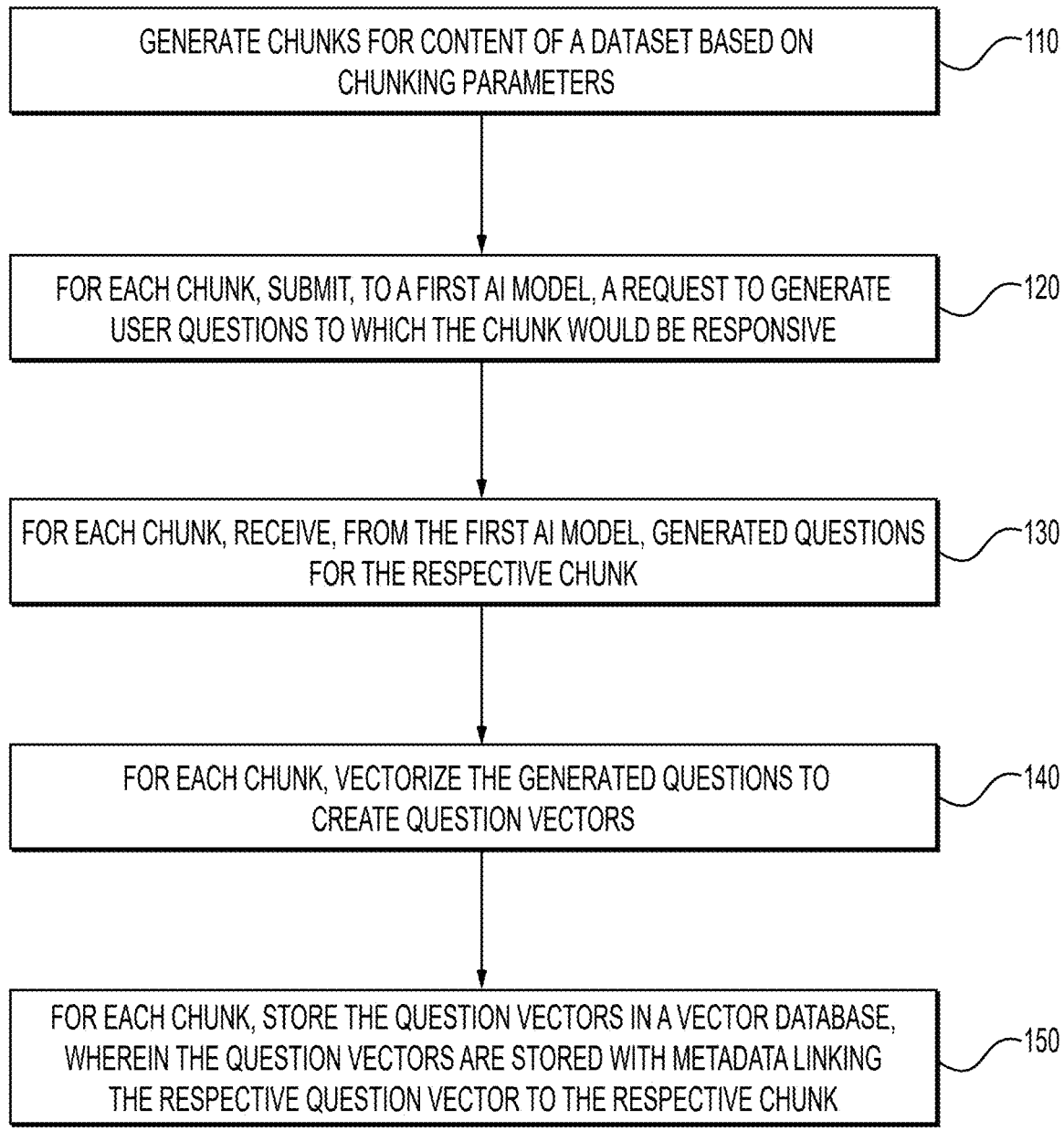
FIG. 1 is a flowchart of an example method for identifying and caching potential queries of an AI pipeline.

Reference will now be made in detail to the present examples, including examples illustrated in the accompanying drawings. Wherever possible, the same reference numbers will be used throughout the drawings to refer to the same or like parts.

The present invention provides a system for generating and storing anticipated user questions within an AI pipeline. After a dataset is ingested and chunked by a pipeline engine, each chunk is processed by a query AI model that generates potential questions tailored to different user personas, such as technical users, support staff, or end users. These questions, along with their corresponding data chunks, are vectorized using an embedding model to capture their semantic meaning. The vectorized questions and associated chunks are then stored in one or more vector databases, allowing for efficient retrieval during future query processing. By preemptively generating questions, the system can anticipate a wide range of user queries and enhance the speed and relevance of responses.

When a user submits a query through an application interface, the system processes it by vectorizing the input and semantically comparing it to the pre-generated question vectors stored in the database. Using similarity metrics, the pipeline engine identifies the most relevant question and retrieves the associated data chunk. The matched question and chunk are then sent to an AI model for further processing and generation of a detailed response. This response is returned to the pipeline engine, which forwards it to the user's device for display. The system ensures that user queries are handled quickly and accurately by leveraging pre-generated questions and semantic matching, providing contextually appropriate answers based on the content of the dataset.

Additionally, an AI agent can be components that communicate across disparate systems. The AI agent can include an orchestrator that distributes communications to communicators. An orchestrator can include a pipeline engine and rules engine, and maintain order based on an AI pipeline manifest. The combination of an orchestrator plus a communicator can collectively act as an assistant for an AI-powered workflow. In some contexts, the AI-powered workflow is referred to as an AI pipeline. Alternatively, the AI agents can include the communicators, and the pipeline can include the orchestrator plus pipeline objects.

The communicator can include a management controller or a third-party services controller. The communicator can have an API used for taking actions according to pipeline objects on an AI pipeline. A token can be used to authenticate a user or the AI platform with the communicator and ensure that the user or AI platform have proper management privileges for actions available at the API. Alternatively, instead of an API, third party services can add a plugin for use as a management controller. The plugin can include code that allows for running processes within the third-party application. The processes can control aspects of the application that the user has the required privileges to control.

FIG. 1 is a flowchart of an example method for identifying and caching potential queries of an AI pipeline. The stages can be performed by a pipeline engine or at the behest of the pipeline engine. The pipeline engine can execute as one or more processes on one or more hardware servers. The pipeline engine can create questions for data chunks from a dataset of an AI pipeline.

At stage 110, a pipeline engine can generate chunks for content of a dataset based on an embedding model and chunking parameters. The dataset serves as reference material or a knowledge base for an AI model. A user can input a query into the AI pipeline, such as asking about a specific aspect of the dataset, and the AI pipeline processes the user's question and uses the dataset to extract relevant content.

In an example, the pipeline engine can generate the chunks in response to addition or upload of a dataset to the AI pipeline. The pipeline engine initially receives the dataset in its raw form, which may consist of a combination of structured and unstructured data, such as text, tables, or figures. To facilitate the efficient processing and retrieval of information, the pipeline engine applies an embedding model to generate numerical representations (embeddings) of the content. The embedding model captures the semantic meaning of the data, enabling the identification of similar concepts and information relationships throughout the dataset.

Once the embeddings are generated, the content is partitioned into manageable segments or "chunks" based on predefined chunking parameters. These parameters can include semantic relevance, optimal token count, or contextual boundaries, which ensure that each chunk remains cohesive and meaningful within the broader context of the dataset. For example, paragraphs or sections of text that convey a distinct concept or information topic may be grouped together as a single chunk. This chunking approach ensures that each segment contains enough information to support contextual comprehension by the LLM, while maintaining a size suitable for efficient processing.

The chunks generated through this process are subsequently stored in an indexed format, allowing for rapid and relevant retrieval during query processing. By ingesting the dataset in this structured manner, the pipeline engine enables the LLM to access the most pertinent information and generate accurate responses to user inquiries. The use of an embedding model and intelligent chunking provides a robust mechanism for semantic search, minimizing the latency and maximizing the relevance of the retrieved information.

At stage 120, for each chunk, the pipeline engine can submit, to a question generation AI model, a request to generate user questions to which the chunk would be responsive. The question generation AI model can be any kind of language model, such as an LLM, a small language model ("SLM"), a fine-tuned model, or a multimodal language model. In one example, the question generation AI model can be specifically trained to generate potential questions an end user may ask about the content of a data chunk. This AI model can be designed to enhance the interactive capability of the system by anticipating the types of inquiries that could arise, thereby streamlining the process of providing relevant and actionable responses. The model can be trained on a wide variety of natural language datasets, allowing it to understand different ways information may be queried and presented.

Upon receiving each data chunk, the question generation AI model can analyze the content to identify key points, important concepts, and potential areas of user interest. The question generation AI model can leverage language generation techniques to craft questions that are contextually aligned with the chunk's content. These questions can range from factual inquiries, such as "What is the maximum speed limit described in this section?" to conceptual questions, like "How does this procedure ensure safety during emergency landings?" By generating a diverse array of possible questions, the AI model not only provides a broad coverage of the information but also aids in creating an index of anticipated user queries, effectively improving the dataset's accessibility.

The AI model is also capable of generating different questions for the same data chunk, tailored to various designated personas. The pipeline engine can specify these personas to reflect different styles, levels of expertise, or user roles. For example, the same chunk can be used to generate highly technical questions for an expert audience, casual questions for a general user, or questions employing colloquial language for users who may use a more informal interaction. Furthermore, the personas can represent different user types, such as an end user seeking practical guidance, an engineer looking for technical details, a management user interested in strategic implications, or a support user needing troubleshooting assistance. By adapting the generated questions to fit these diverse personas, the AI model ensures that the data is accessible and relevant to a broader audience, enhancing the flexibility and usability of the system across various contexts and user needs.

At stage 130, for each chunk, the pipeline engine can receive generated questions for the respective chunk. This transfer process can include packaging the questions along with metadata that links each question to its respective data chunk and persona designation. The software engine receives these questions through a structured data communication protocol, ensuring that the information is accurately transmitted and can be efficiently processed.

At stage 140, for each chunk, the pipeline engine can vectorize the generated questions to create question vectors. The pipeline engine can vectorize the questions using an embedding model. This embedding model transforms the questions into high-dimensional numerical representations, known as vectors, which capture the semantic meaning of each question. The engine applies this transformation to ensure that questions with similar meanings, even if worded differently, are positioned closely in the vector space. By doing so, the system enables more efficient search and retrieval, allowing it to match user queries with the most relevant pre-generated questions.

The embedding process enhances the system's ability to compare and rank questions based on their contextual and semantic similarities. For example, questions generated for different personas, such as technical and casual users, may be vectorized and mapped in such a way that their underlying meaning is preserved, even if the language or tone differs.

At stage 150, the pipeline engine can store the question vectors in a vector database. These vectorized representations can be stored in an indexed format, allowing the AI pipeline to quickly retrieve the most relevant questions during real-time user interactions. This vectorization not only streamlines search capabilities but also improves the overall responsiveness and accuracy of the AI pipeline.

The questions generated for each data chunk can be further utilized to enhance search relevance and user engagement. By proactively generating these potential questions, the system can create a question-answer mapping that aligns with the data chunks, facilitating more intuitive user interaction. This process enables the system to deliver pre-constructed answers or guide the LLM in formulating responses when similar questions are asked by users. This preemptive question generation also helps optimize the AI pipeline's retrieval function, reducing response times and improving the overall user experience by making information more readily accessible and directly applicable to user needs.

Although generated questions are discussed herein, it is understood that generated inputs can also more broadly apply to the examples. For example, instead of generating a question, the AI model could generate an input, which could be a combination of selections the user might make on a UI that utilizes a particular AI pipeline. A generated input can include a generated question, including predicted questions from a persona.

Figure 2:
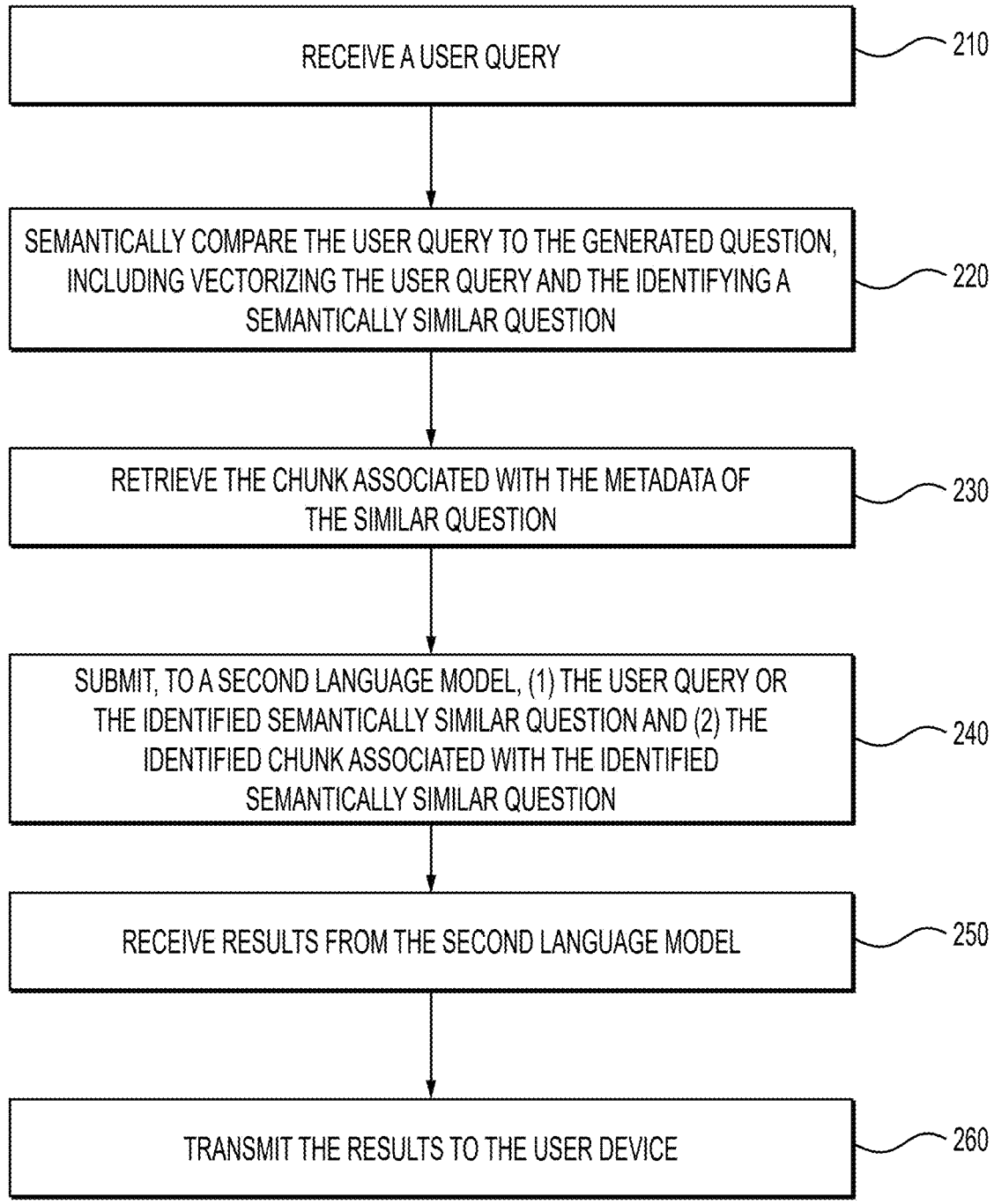
FIG. 2 is a flowchart of an example method for matching a query input to a pre-generated question for an AI pipeline.

FIG. 2 is a flowchart of an example method for matching a query input to a pre-generated question for an AI pipeline. The stages can be performed by a pipeline engine or at the behest of the pipeline engine. Alternatively, the stages can be performed by another engine, such as a pipeline engine, or at the behest of the other engine. The pipeline engine can execute as one or more processes on one or more hardware servers. The method described below can take place after the stages outlined in FIG. 1, where questions have already been generated, vectorized, and stored in a vector database, along with metadata linking them to their corresponding data chunks.

At stage 210, a pipeline engine can receive a user query as input. The query is one type of received input. For example, a user can input a query into an interface for an AI pipeline. In one example, the pipeline engine can directly receive user queries for the AI pipeline. Alternatively, the query can initially be received by a component that manages the AI pipeline, such as a pipeline engine. The pipeline engine can communicate to the pipeline engine that a user query has been received. The pipeline engine can then access the query. For example, the pipeline engine can save the user query in a cache that the pipeline engine can access.

At stage 220, the pipeline engine can semantically compare the input to the generated questions. To begin, the pipeline engine can vectorize the input by applying the same embedding model that was used to generate embeddings for the pre-generated questions. This transforms the query into a numerical vector that captures its semantic meaning, allowing it to be compared with the existing vectors in the database. By utilizing vector embeddings, the engine ensures that even if the wording of the user query differs from the pre-generated questions, the underlying intent or meaning can still be effectively matched.

Once the user query is vectorized, the pipeline engine can compute the similarity between the query's vector and the stored vectors of the pre-generated questions for the dataset. This comparison can be based on mathematical techniques such as cosine similarity, which measures how closely aligned two vectors are in the high-dimensional space. The engine retrieves the pre-generated questions whose vectors are most similar to the query vector, identifying those that best match the semantic intent of the user's query. Because the vector embeddings capture nuances in language and context, the system can recognize relevant questions even if the user phrased the query differently or used synonyms.

After identifying the closest matches, the software engine retrieves the pre-generated questions along with their associated data chunks from the vector database. These results are then used to formulate a response, either by presenting the most relevant question-answer pairs directly to the user or by refining the search results for the language model to generate a tailored response. This semantic comparison process enables the AI pipeline to efficiently handle user queries, ensuring that the system retrieves and delivers contextually relevant information with high accuracy, even when the user's query is not an exact match to the pre-generated questions.

At stage 230, the pipeline engine can retrieve the chunk associated with the metadata of the similar question. Each pre-generated question in the vector database is stored alongside metadata that links it to a specific data chunk from the original dataset. By referencing this metadata, the engine quickly locates the corresponding data chunk, ensuring that the information relevant to the user's query is readily accessible. The chunks can be stored in the same or a different vector database as the embeddings for the pre-generated questions. Table 1 below is an example entry in a vector database that includes the question embeddings and the metadata.

TABLE 1

```
{
    "id": "chunk_123",
    "queries_embedding": [0.45, 0.89, 0.12, ...],
    "queries_embedding": [0.45, 0.88, 0.12, ...],
    "queries_embedding": [0.45, 0.89, 0.11, ...],
    "metadata": {
        "chunk_text": "This is a sample text chunk. ",
    }
}
```

In TABLE 1, the "id" is an ID associated with the corresponding chunk, "chunk_text" is the text of the chunk from the dataset, and "queries_embedding" are the vector embeddings of the pre-generated questions. As shown, the chunked text is stored as metadata.

Table 2 below is an example entry in a vector database that includes the pre-generated questions ("query" field), their respective embeddings ("queries_embedding" field), and an ID for the chunk ("chunk_ID" field).

TABLE 2

```
{
    "query": "Text of first question",
    "query_embedding": [0.32, 0.45, 0.18, ...],
    "query": "Text of second question",
    "query_embedding": [0.32, 0.45, 0.18, ...],
    "chunk_id": "chunk_001"
}
```

The chunk_ID field in references a corresponding chunk stored in a second vector database. For example, as shown below in the example entry in TABLE 3 below, entries in the second vector database can include a chunk_id field that maps to the chunk_id field in the first vector database. The second database entries can also into the chunked text ("chunk" field) and an embedding of the chunked text ("embedding" field).

TABLE 3

```
{
    "chunk": "This is the chunked text ",
    "embedding": [0.25, 0.34, 0.15, ...],
    "chunk_id": "chunk_001"
}
```

In instances in which two vector databases are used like with TABLE 2 and TABLE 3, the pipeline engine can semantically compare the user input to the vector embeddings of the pre-generated questions, retrieve the corresponding chunk ID, and retrieve the chunked text and/or the chunk embedding with the matching chunk ID from the second vector database.

In another example, the metadata can include a question ID or a result ID. Either ID can be associated with a stored result, allowing the AI pipeline execution engine to use the metadata to retrieve the stored result. This can allow for bypassing stages 240 and 250, and sending the stored result to the user device at stage 260.

At stage 240, the pipeline engine can submit, to a second AI model, (1) the user query or the identified semantically similar question and (2) the identified chunk associated with the identified semantically similar question. The second AI model can be an AI model assigned to the AI pipeline. In one example, the pipeline engine sends the user's query along with the relevant data chunk to the second AI model. However, in cases where an organization prefers to limit user-generated queries, the pipeline engine can instead submit the semantically similar pre-generated question and the associated chunk. This approach helps mitigate the risk of unexpected responses and prevents users from injecting unintended prompts.

At stage 250, after the second AI model processes the inputs-whether the user query or the semantically similar pre-generated question along with the associated data chunk the pipeline engine can receive the resulting output from the model. This output may consist of a refined response, an answer based on the content of the data chunk, or additional information synthesized by the AI model. Upon receiving the results, the pipeline engine can further process or format the response to ensure it aligns with the desired output for the end user.

At stage 260, the pipeline engine can transmit the results to the user device. The user device can then display the results to the user. This seamless interaction between the software engine and the second AI model ensures that the user receives contextually relevant and accurate information, whether the question was user-generated or selected from pre-generated queries.

As mentioned in the description of stage 230, similar steps can be used to retrieve stored (e.g., cached) results. For example, the result of stage 250 can also be stored for later retrieval, such as in a cache storage. In one example, the result can be stored in association with a question ID that corresponds to metadata of the question vector. When a future AI pipeline input is received, vectorized, and matched against the question vector, the AI pipeline execution engine can check for a corresponding cached result. For example, the stored results can be searched using the question ID. When there is a match, the submission to the second AI model at stage 240 can be bypassed.

Alternatively, the AI pipeline execution engine can add a result ID to the question vector metadata, such as at stage 250 or 260. Then the future AI pipeline input can be matched to the stored result by looking up the result using the result ID obtained from the semantically similar question vector. In either approach, the AI pipeline execution engine can store the result in association with metadata of the question vector. In the future, when the AI pipeline execution engine receives an AI pipeline input from a user device, the AI pipeline execution engine can vectorize part of the AI pipeline input to create an input vector. Then the AI pipeline execution engine can cause identification of the question vector as meeting a threshold similarity to the input vector, such as a threshold distance or angle. In some examples, a question vector is considered a match when a matching score exceeds the similarity threshold, again based on distance or angle. The AI pipeline execution engine can then retrieve the stored result using the metadata of the question vector. The stored result can be transmitted to the user device, bypassing submitting the stored version of the result to the second AI model at stage 240.

In one example, a table or other data structure that relates the question ID or result ID to a result can also include access privileges required to access the result. This can ensure that cached results are only available to users with the appropriate access privileges or credentials. The required access privileges can be derived based on permission requirements of the chunks used in creating the result. For example, the chunks can be designated the same permissions (e.g., highly confidential) as the content item to which they pertain or can have their own permission designations. The pipeline engine can take an intersection of the chunk permissions, resulting in a least permissive combination of the permissions, and designate the access privileges of the result as having that least permissive combination. Then, when a user submits an AI pipeline input that implicates the stored result, the access privileges of the stored result can be compared against the access privileges of the user. If the user has the same or higher access privileges as the result, the pipeline engine can supply the stored result and bypass stages 240 and 250.

Figure 3:
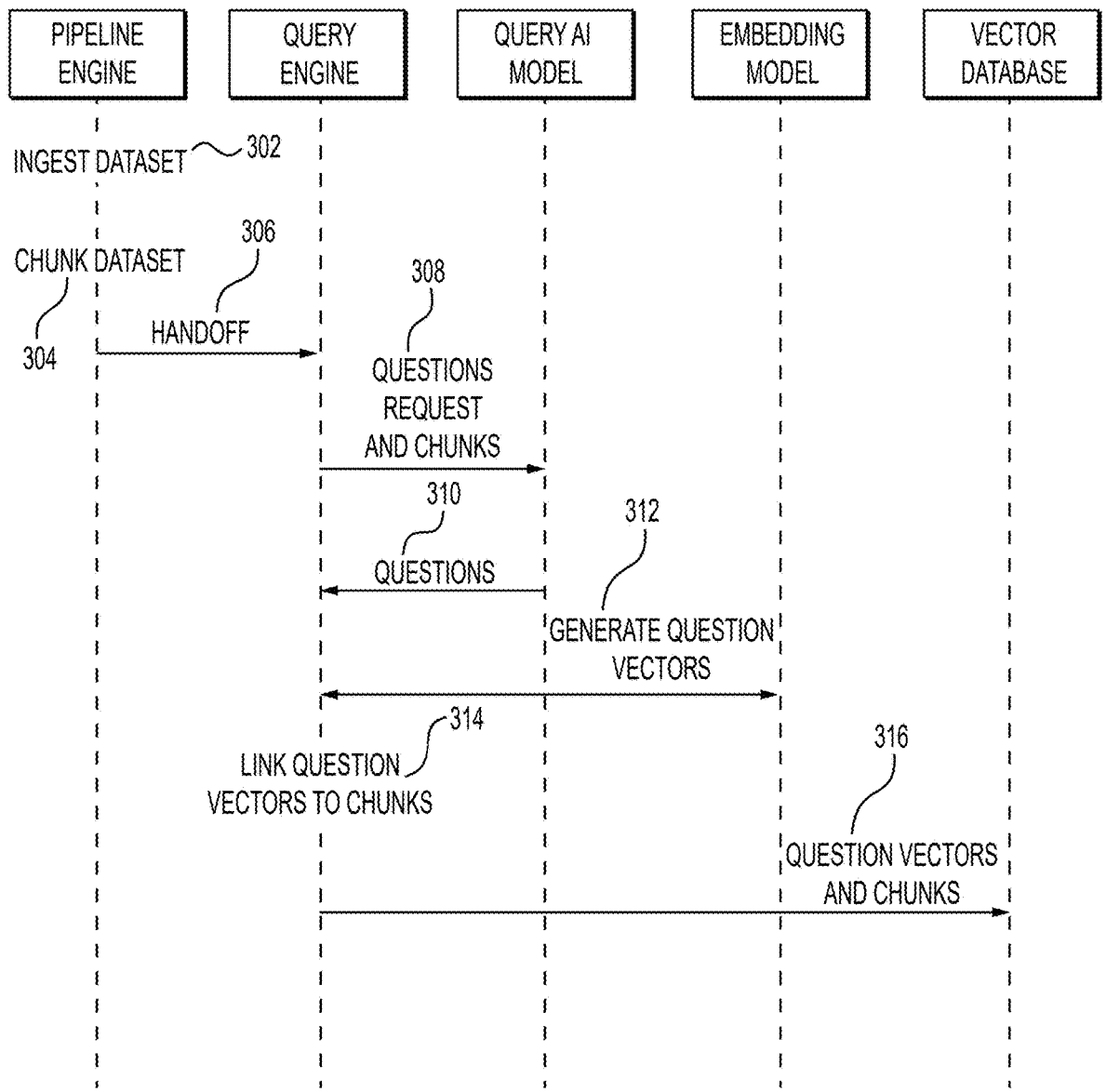
FIG. 3 is a sequence diagram of an example method for identifying and caching potential queries of an AI pipeline.

FIG. 3 is a sequence diagram of an example method for identifying and caching potential queries of an AI pipeline. At stage 302, a pipeline engine can ingest a dataset for an AI pipeline. This can occur when an AI pipeline is created or updated. A dataset can be added to an AI pipeline through several methods, utilizing different communication protocols to suit various system architectures. One common method is through direct upload via a Representational State Transfer ("REST") Application Programming Interface ("API"), where a client application sends the dataset to the AI pipeline's ingestion endpoint over Hypertext Transfer Protocol ("HTTP") or HTTP Secure ("HTTPS"). In this approach, the dataset is can be submitted as a JavaScript Object Notation ("JSON") or multipart/form-data payload, along with relevant metadata, such as its format or source. The API handles the upload, validates the dataset, and initiates its storage for further processing within the pipeline. Other methods that can be used include message queuing protocols, such as Advanced Message Queuing Protocol ("AMQP") or Message Queuing Telemetry Transport ("MQTT"), and File Transfer Protocols ("FTP") or Secure FTP ("SFTP").

Upon ingesting the dataset, the pipeline engine can initiate a multi-stage preprocessing workflow that structures the raw data for optimized interaction with the AI pipeline. Upon ingestion, the engine first parses the dataset, which may consist of structured, semi-structured, or unstructured data formats, such as text, images, or tabular information.

At stage 304, a pipeline engine can chunk the dataset. This can include segmenting the data into discrete, contextually meaningful units, or "chunks," based on predefined chunking parameters, such as token count thresholds or semantic boundaries.

At stage 306, the pipeline engine can signal the pipeline engine to take over by triggering a handoff mechanism. This can occur through an internal event, message, or API call. The pipeline engine's role ends after it preprocesses the data, dividing it into manageable chunks and storing them in the system along with relevant metadata. Upon receiving the signal, the pipeline engine activates and begins processing the newly created chunks.

At stage 308, for each chunk, the pipeline engine can send, to a question generation AI model, a request for a set of anticipated questions a user may likely ask about the specific chunk. In the request, the pipeline engine can specify multiple personas, each corresponding to distinct user types, including, but not limited to, highly technical users (e.g., engineers), support-level users (e.g., customer service), and end users (e.g., general consumers). The inclusion of personas allows the question generation AI model to tailor its question generation based on the expected knowledge level, language style, and context relevant to each user type.

The question generation AI model processes this input by analyzing the semantic and structural properties of the data chunk and synthesizing a variety of questions specific to each persona. For a highly technical user, the question generation AI model may generate detailed, jargon-heavy questions that probe deep into the functionality or technical specifications outlined in the data chunk. In contrast, for a support-level user, the questions may focus on troubleshooting procedures or user-friendly explanations, while for end users, the question generation AI model may produce simpler, high-level questions that emphasize general functionality or practical application.

At stage 310, the question generation AI model can send the generated questions to the pipeline engine. These questions are transmitted in a structured format, such as a JSON file or an eXtensible Markup Language ("XML") file.

The pipeline engine retrieves these persona-specific questions and links them back to the corresponding data chunk, along with metadata that associates each question with its respective persona. This interaction enables the system to anticipate diverse user queries, ensuring that the AI pipeline can dynamically respond to different user needs while maintaining high relevance to the original dataset.

At stage 312, the pipeline engine can vectorize each question to enable efficient semantic search and retrieval. The vectorization process involves applying an embedding model, such as a pre-trained transformer-based model (e.g., Bidirectional Encoder Representations from Transformers ("BERT") or Generative Pre-trained Transformer ("GPT") embeddings), which converts the textual questions into high-dimensional vector representations. The pipeline engine performs this operation for each question.

At stage 314, the pipeline engine can link the question vectors to their corresponding chunks. In one example, the pipeline engine can create a vector database entry for each data chunk, and each entry can include the vectorized questions with metadata of the chunked text, such as that shown in TABLE 1. The pipeline engine can then save these in a vector database at stage 316. Alternatively, the pipeline engine can create separate vector database entries for the vectorized questions and their corresponding data chunks, and the pipeline engine can reference the entries to each other. The pipeline engine can then save the vectorized questions in one vector database and the chunked text in another. In some examples, the generated questions sent by the generation AI model at stage 310 can already include metadata that links each question to its corresponding persona and the associated data chunk. In such instances, the pipeline engine can reformat the data based on the storage mechanism used.

Figure 4:
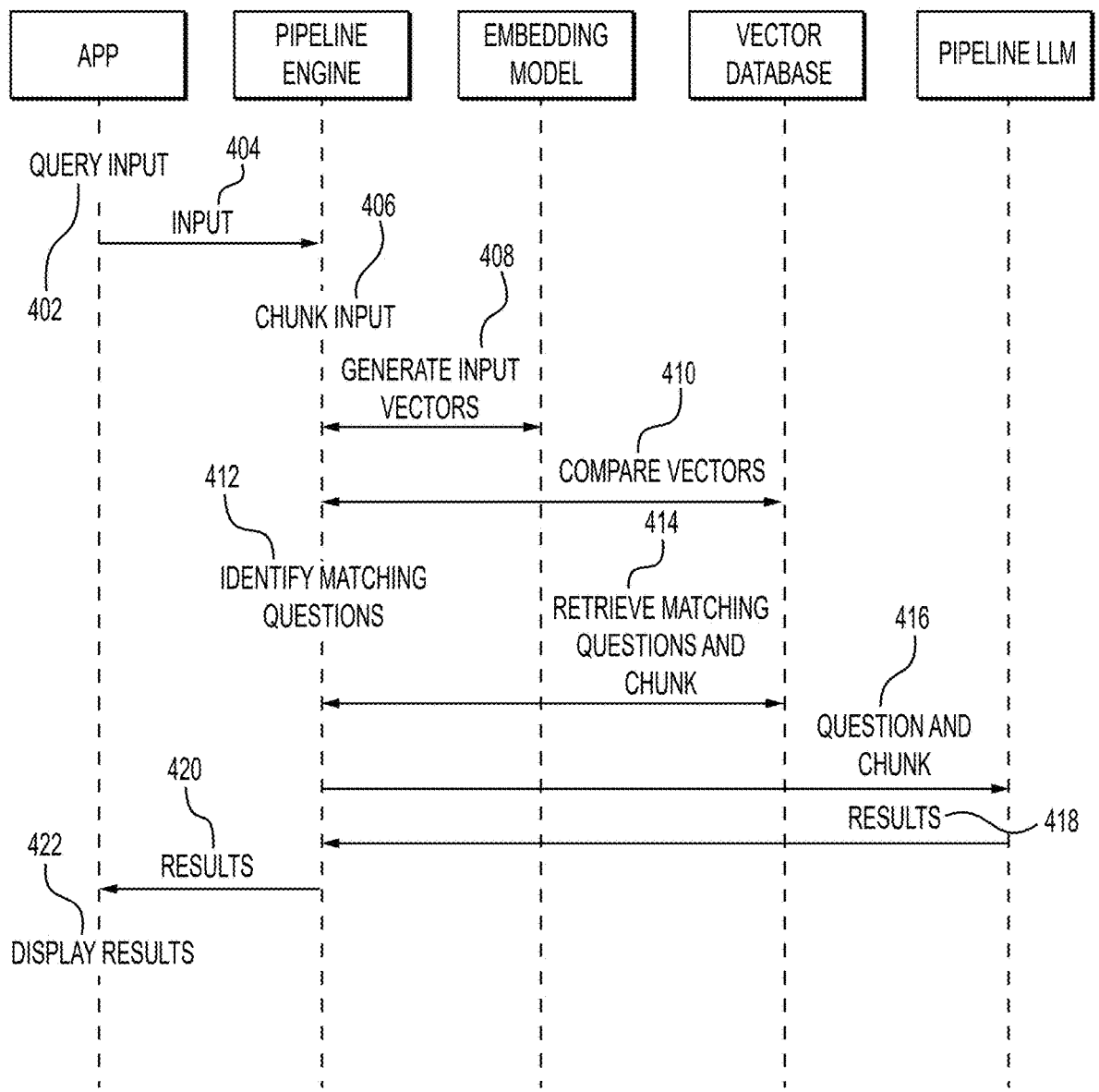
FIG. 4 is a sequence diagram of an example method for matching a query input to a pre-generated question for an AI pipeline.

FIG. 4 is a sequence diagram of an example method for matching a query input to a pre-generated question for an AI pipeline. This can be used to match a generated input and retrieve a chunk associated with the matching generated input. This method can occur after the method of FIG. 3 above is completed. For example, before stage 402, questions that users may ask about each data chunk in a dataset have been pre-generated, vectorized, and stored in a vector database, along with metadata linking them to their corresponding data chunks.

At stage 402, a user can input a query into an application. The application can be front-end layer for interacting with AI pipelines. The application is designed to capture, process, and relay user queries.

At stage 404, the application can send the input to a pipeline engine. The application can send the input using any appropriate communication protocol, such as an API or HTTPS call. The input can include the user's request and any relevant metadata, such as information identifying the user, the user's profile, any groups the user is assigned to, and so on.

At stage 406, the pipeline engine can chunk the input. This can include segmenting the input into smaller, contextually relevant units. This chunking is based on predefined chunking parameters, such as token limits or semantic boundaries, ensuring that each chunk retains coherence for further processing. The pipeline engine can apply natural language processing ("NLP") techniques to ensure that the segmentation maintains logical structure, allowing each chunk to represent a self-contained portion of the query, which can then be efficiently processed by downstream components, such as an AI model.

At stage 408, the pipeline engine can generate input vectors. The pipeline engine can do this by applying an embedding model, such as a transformer-based architecture like BERT or GPT. This model converts the chunked text into dense, high-dimensional vector representations, where each vector captures the semantic properties and relationships of the input data. By encoding the chunks into vectors, the engine creates a numerical representation that can be efficiently compared with other vectors in the system, such as those from pre-generated questions or dataset content.

At stage 410, the pipeline engine can compare the input vectors with the pre-generated question vectors in the vector database. Using methods such as cosine similarity or other distance metrics, the engine measures the alignment between the high-dimensional vectors, assessing the degree of semantic overlap. This comparison enables the engine to identify which pre-generated questions, based on their vectors, are most closely related to the meaning of the user's input, even if the phrasing is different. The vector-based matching ensures that the system captures not only syntactic similarities but also deeper contextual and conceptual relationships between the user's query and the dataset's pre-generated questions.

At stage 412, the pipeline engine can identify a matching question. In one example, a matching question can be a question that is the most semantically similar to the user input. For example, cosine similarity measures the cosine of the angle between two vectors in a multidimensional space, producing a value between −1 and 1. When using a cosine similarity technique, the matching question can be the question with the value closest to 1. In one example, a minimum score threshold can be used to ensure that the identified question is, in fact, semantically similar. For example, when using cosine similarity, the pipeline engine can require that the most semantically similar question scores at least a 0.5.

Once the closest matches are identified, the corresponding data chunks or responses can be retrieved for further processing, allowing the system to provide a contextually relevant answer to the user.

At stage 414, the pipeline engine can retrieve the matching question and corresponding chunk. The pipeline engine can use the metadata linked to the matching vector to locate the precise data chunk tied to that question. This retrieved data chunk contains the relevant information from the original dataset, which the pipeline engine can now pass along for further processing.

At stage 416, the pipeline engine can send the question and the chunk to the pipeline AI model. This can occur using an external API call, allowing the AI model to process the data in real time. The pipeline engine can be configured to send either the user's query or the matching question to the pipeline AI model. The pipeline engine formats the data according to the API requirements of the pipeline AI model, ensuring proper transmission of the question and the relevant chunk. The AI model, can process the question and data chunk to generate a detailed and contextually accurate response. At stage 418, the AI model can send the results to the pipeline engine.

At stage 420, the pipeline engine can send the results to the application. In an example, the pipeline engine can process the response to ensure it aligns with the application's format and user interface requirements. The pipeline engine then packages the response, including any relevant metadata or context, and sends it back to the application via a secure API or messaging protocol.

Once the application receives the results, at stage 422, it renders the response in a user-friendly format, making it easily accessible and understandable for the end user.

Figure 5:
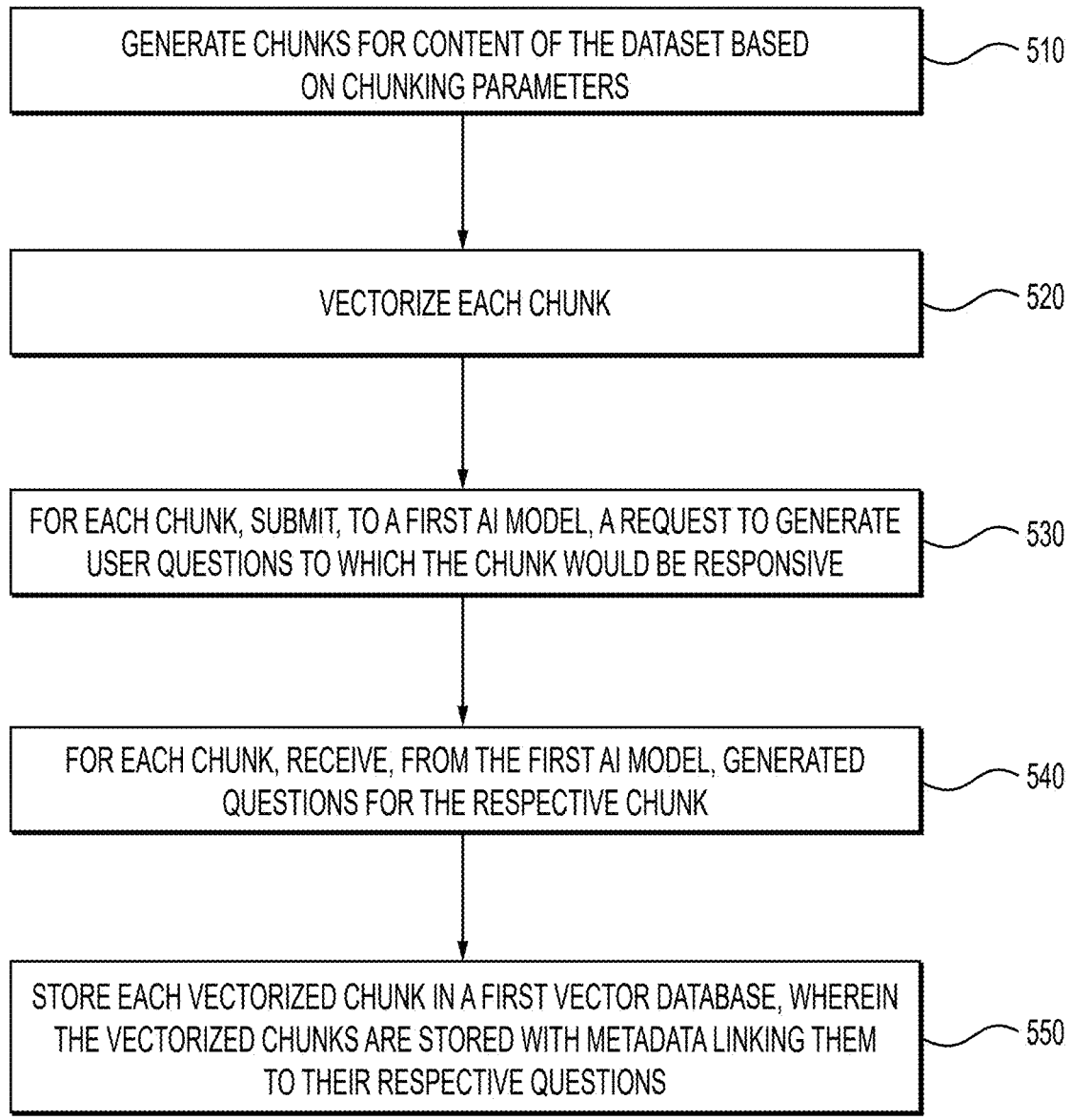
FIG. 5 is a flowchart of another example method for identifying and caching potential queries of an AI pipeline.

FIG. 5 is a flowchart of another example method for identifying and caching potential AI pipeline inputs (e.g., queries) of an AI pipeline that includes keyword matching. Although queries are used as an example, the AI pipeline input need not be a query. For example, a string of letters or numbers can be used to match against chunks or cached results, in an example. But for ease of explanation, queries are described in the following figures. At stage 510, a pipeline engine can generate chunks for content of a dataset based on an embedding model and chunking parameters. The dataset serves as reference material or a knowledge base for an AI model. A user can input a query into the AI pipeline, such as asking about a specific aspect of the dataset, and the AI pipeline processes the user's question and uses the dataset to extract relevant content.

In an example, the pipeline engine can generate the chunks in response to addition or upload of a dataset to the AI pipeline. The pipeline engine initially receives the dataset in its raw form, which may consist of a combination of structured and unstructured data, such as text, tables, or figures. To facilitate the efficient processing and retrieval of information, the pipeline engine applies an embedding model to generate numerical representations (embeddings) of the content. The embedding model captures the semantic meaning of the data, enabling the identification of similar concepts and information relationships throughout the dataset.

Once the embeddings are generated, the content is partitioned into manageable segments or "chunks" based on predefined chunking parameters. These parameters can include semantic relevance, optimal token count, or contextual boundaries, which ensure that each chunk remains cohesive and meaningful within the broader context of the dataset. For example, paragraphs or sections of text that convey a distinct concept or information topic may be grouped together as a single chunk. This chunking approach ensures that each segment contains enough information to support contextual comprehension by the LLM, while maintaining a size suitable for efficient processing.

The chunks generated through this process are subsequently stored in an indexed format, allowing for rapid and relevant retrieval during query processing. By ingesting the dataset in this structured manner, the pipeline engine enables the LLM to access the most pertinent information and generate accurate responses to user inquiries. The use of an embedding model and intelligent chunking provides a robust mechanism for semantic search, minimizing the latency and maximizing the relevance of the retrieved information.

At stage 520, the pipeline engine can vectorize the chunks using an embedding model. This embedding model transforms the questions into high-dimensional numerical representations, known as vectors, which capture the semantic meaning of each question. The pipeline engine applies this transformation to ensure that chunks with similar meanings, even if worded differently, are positioned closely in the vector space. By doing so, the system enables more efficient search and retrieval.

At stage 530, for each chunk, the pipeline engine can submit, to a question generation AI model, a request to generate user questions to which the chunk would be responsive. The question generation AI model can be any kind of language model, such as an LLM, an SLM, a fine-tuned model, or a multimodal language model. In one example, the question generation AI model can be specifically trained to generate potential questions an end user may ask about the content of a data chunk. This AI model can be designed to enhance the interactive capability of the system by anticipating the types of inquiries that could arise, thereby streamlining the process of providing relevant and actionable responses. The model can be trained on a wide variety of natural language datasets, allowing it to understand different ways information may be queried and presented.

Upon receiving each data chunk, the question generation AI model can analyze the content to identify key points, important concepts, and potential areas of user interest. The question generation AI model can leverage language generation techniques to craft questions that are contextually aligned with the chunk's content. These questions can range from factual inquiries, such as "What is the maximum speed limit described in this section?" to conceptual questions, like "How does this procedure ensure safety during emergency landings?" By generating a diverse array of possible questions, the AI model not only provides a broad coverage of the information but also aids in creating an index of anticipated user queries, effectively improving the dataset's accessibility.

The AI model is also capable of generating different questions for the same data chunk, tailored to various designated personas. This can result in the generated inputs reflecting predicted user questions from the various personas. The pipeline engine can specify these personas to reflect different styles, levels of expertise, or different user roles. For example, the same chunk can be used to generate highly technical questions for an expert audience, casual questions for a general user, or questions employing colloquial language for users who may use a more informal interaction. Furthermore, the personas can represent different user types, such as an end user seeking practical guidance, an engineer looking for technical details, a management user interested in strategic implications, or a support user needing troubleshooting assistance. By adapting the generated questions to fit these diverse personas, the AI model ensures that the data is accessible and relevant to a broader audience, enhancing the flexibility and usability of the system across various contexts and user needs.

At stage 540, the pipeline engine can receive generated questions for each chunk. This transfer process can include packaging the questions along with metadata that links each question to its respective data chunk and persona designation. The software engine receives these questions through a structured data communication protocol, ensuring that the information is accurately transmitted and can be efficiently processed.

At stage 550, the pipeline engine can store each vectorized chunk in a vector database where vectorized chunks are stored with metadata linking them to their respective questions. For example, each database entry can include the chunked text and respective vector embeddings, and the pre-generated questions can be stored as metadata for the chunked text. Table 4 below is an example entry in a vector database that includes the chunk embeddings and the metadata with pre-generated questions.

TABLE 4

```
{
  "id": "chunk_123",
  "embedding": [0.45, 0.89, 0.12, ...],
  "metadata": {
    "chunk_text": "This is a sample text chunk. ",
    "probable_queries": [
      "What is this chunk about? ",
      "Summarize the text in this chunk. "
    ]
  }
}
```

In TABLE 4, the "id" is an ID associated with the corresponding chunk, "embedding" is the vector embedding of the chunk, "metadata" is the metadata for the entry, "chunk_text" is the text of the chunk from the dataset, and "probable_queries" are the text for the pre-generated questions.

Figure 6:
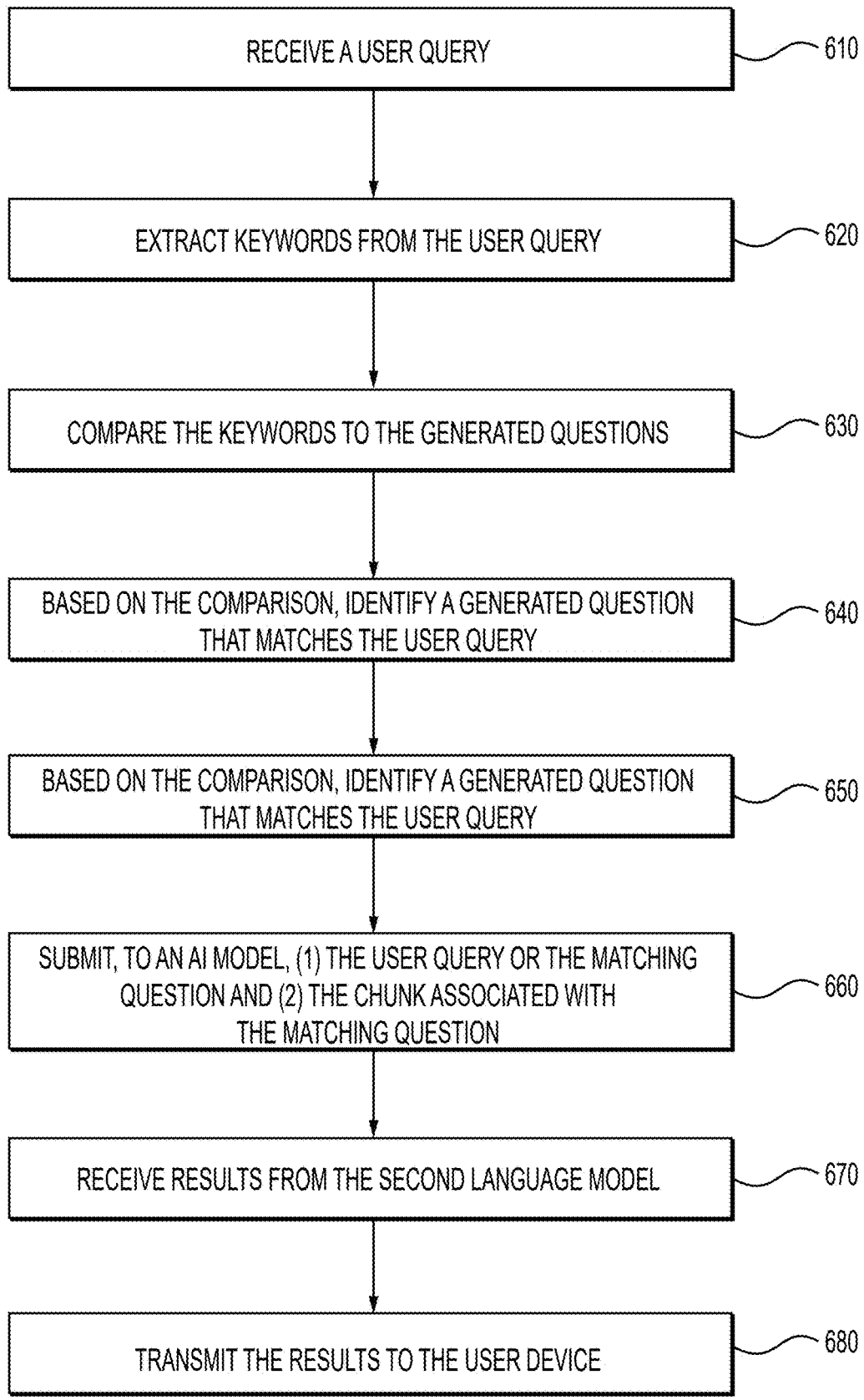
FIG. 6 is a flowchart of another example method for matching a query input to a pre-generated question for an AI pipeline.

FIG. 6 is a flowchart of another example method for matching a query input to a pre-generated question for an AI pipeline. The stages can be performed by a pipeline engine or at the behest of the pipeline engine. Alternatively, the stages can be performed by another engine, such as a pipeline engine, or at the behest of the other engine. The pipeline engine can execute as one or more processes on one or more hardware servers. The method described below can take place after the stages outlined in FIG. 1, where questions have already been generated, vectorized, and stored in a vector database, along with metadata linking them to their corresponding data chunks.

At stage 610, a pipeline engine can receive a user query. For example, a user can input a query into an interface for an AI pipeline. In one example, the pipeline engine can directly receive user queries for the AI pipeline. Alternatively, the query can initially be received by a component that manages the AI pipeline, such as a pipeline engine. The pipeline engine can communicate to the pipeline engine that a user query has been received. The pipeline engine can then access the query. For example, the pipeline engine can save the user query in a cache that the pipeline engine can access.

At stage 620, the pipeline engine can extract keywords from the user query. For example, the pipeline engine can preprocess the query by performing tokenization to split the input into individual components, followed by normalization steps that convert all text to lowercase and remove common stop words. The pipeline engine can then employ stemming techniques to reduce words to their root forms. Finally, a scoring algorithm can be applied to rank the extracted keywords based on their relevance to the overall context of the user query. This refined set of keywords can then be utilized in subsequent stages of the AI pipeline, enhancing the system's capability for information retrieval, context recognition, and response generation.

Several scoring algorithms could be applied to rank the extracted keywords based on their relevance to the user query. For example, a Term Frequency-Inverse Document Frequency (TF-IDF) algorithm can be employed. TF-IDF is a statistical measure used to evaluate the importance of a word in a document relative to a collection (or corpus) of documents. It calculates two values: the term frequency (TF), which measures how often a word appears in the document, and the inverse document frequency (IDF), which measures how common or rare the word is across all documents. After stemming and stop-word removal, the TF-IDF score could be calculated for each keyword in the user query. Keywords with higher TF-IDF scores would indicate higher relevance for retrieval and response generation.

Alternatively, BM25 is an extension of TF-IDF and is often used for information retrieval tasks because it incorporates term saturation and document length normalization. It ranks documents based on the query's terms' frequency and positions within the documents. For query keyword extraction, BM25 could rank keywords based on their frequency and the lengths of the queries. This ranking method can further prioritize keywords that appear frequently and in shorter, more direct queries.

Another option is Cosine Similarity with Word Embeddings. Cosine similarity measures the cosine of the angle between two non-zero vectors in a multi-dimensional space. With word embeddings (e.g., Word2Vec or GloVe), the model calculates the semantic similarity between keywords and other terms based on context rather than pure word frequency. By calculating the cosine similarity between the query and potential keywords or phrases in the corpus, the engine could rank keywords based on semantic closeness to the query's context.

Pointwise Mutual Information (PMI) measures the association between two words by comparing the observed frequency of the word pair to the probability expected if they were independent. High PMI scores indicate a stronger association. PMI can score keywords based on their likelihood of co-occurring with other query words in a corpus, thus providing a measure of contextual relevance.

Neural Scoring Algorithms (e.g., BERTScore) can be used based on their transformer-based models (like BERT). BERTScore can evaluate similarity by comparing word embeddings for both precision and recall in context. For high-accuracy keyword ranking, the pipeline could use BERTScore to compare embeddings of extracted keywords against the user query, refining relevance scores with contextual sensitivity.

Each of these scoring algorithms could be employed independently or in combination, depending on the system's requirements for speed, precision, and context sensitivity in keyword ranking.

At stage 630, the pipeline engine can compare the keywords to the pre-generated questions. This comparison process can leverage a combination of techniques, including exact keyword matching, fuzzy matching, and semantic analysis, to assess the degree of similarity between the user input and the stored questions. In one example, the pipeline engine can rank the stored questions to identify the most suitable match for the user query. This process not only enhances the accuracy of the matching but also improves the system's capability to understand user intent effectively.

In this approach, the pipeline engine matches user query keywords to pre-generated questions by leveraging one or more of the techniques—exact keyword matching, fuzzy matching, and semantic analysis—to determine similarity and relevance between the query and stored questions. Exact keyword matching provides a straightforward comparison by identifying direct matches between keywords in the user query and words in the stored questions. This approach is computationally efficient and effective for initial filtering, particularly when dealing with straightforward queries, although it may be limited in handling nuanced language or alternative phrasings. To enhance this, fuzzy matching techniques can be employed, allowing the engine to identify approximate matches that accommodate minor misspellings, typos, or small variations in word structure. Common fuzzy matching methods include Levenshtein Distance (edit distance), Jaccard Similarity, and N-gram matching, which offer a similarity score based on how closely terms match. These techniques broaden the scope of matches by capturing slight deviations, making the engine more robust in handling variations without sacrificing matching precision. To further capture user intent, the system can apply semantic analysis, which relies on machine learning models or pre-trained word embeddings, such as Word2Vec, GloVe, or BERT, to analyze the meaning behind words and phrases in the query. These models represent terms as vectors in a multi-dimensional space, enabling the engine to recognize words with similar meanings even when phrasing differs between the user query and stored questions. By using vector-based similarity measures, such as cosine similarity, semantic analysis determines the closeness of meaning between the query and stored questions, accounting for context and enhancing the matching accuracy.

In one example, the pipeline engine combines these techniques sequentially to optimize efficiency and depth. It begins by applying exact or fuzzy matching for an initial filtering, quickly excluding irrelevant questions. The pipeline engine then performs fuzzy matching to capture slight variations in phrasing and broadens the pool of relevant questions. The system performs a semantic analysis to assess user intent accurately, refining the match results based on contextual meaning. By layering exact matching, fuzzy matching, and semantic analysis, the pipeline engine provides both speed and depth, ensuring that responses are both relevant and contextually aligned with user queries. This multi-layered approach can allow the system to prioritize accuracy without compromising processing speed.

At stage 640, based on the comparison, the pipeline engine can identify a generated question that matches the user query. For example, the matching process can involve calculating a score for each question based on a scoring metric that considers several factors, including the number of keyword matches, the frequency of those keywords, and their proximity within the question. The pipeline engine can systematically count the total occurrences of each keyword from the user query within each stored question, assigning higher scores to questions with more substantial keyword overlap. Counting a total number of occurrences of each keyword from the input within each stored question can yield a higher score for questions with keyword overlap since the count can continue to increase as each different keyword is identified.

Additionally, the scoring metric can incorporate penalties for irrelevant keywords or consider the context in which the keywords appear. Ultimately, the question that yields a highest score can be selected as the matching question, serving as the basis for generating a relevant response that closely aligns with the user's intent. This method ensures that the system not only finds a relevant question but also prioritizes the one that is most likely to provide an accurate and helpful answer.

At stage 650, the pipeline engine can retrieve the chunk associated with the matching question. The chunked data comprises relevant information, such as context, background details, and potential answers linked to the matching question. This structured data is designed to provide comprehensive support for generating a tailored response to the user query. The engine systematically fetches this chunked data, ensuring that all pertinent information related to the matching question is gathered.

At stage 660, the pipeline engine can submit, to a second AI model, (1) the user query or the matching question and (2) the chunk associated with the matching question. The second AI model can be an AI model assigned to the AI pipeline. In one example, the pipeline engine sends the user's query along with the relevant data chunk to the second AI model. However, in cases where an organization prefers to limit user-generated queries, the pipeline engine can instead submit the matching pre-generated question and the associated chunk. This approach helps mitigate the risk of unexpected responses and prevents users from injecting unintended prompts.

After the second AI model processes the inputs—whether the user query or the pre-generated question along with the associated data chunk—the pipeline engine can receive the resulting output from the model. This output may consist of a refined response, an answer based on the content of the data chunk, or additional information synthesized by the AI model. Upon receiving the results, the pipeline engine can further process or format the response to ensure it aligns with the desired output for the end user.

At stage 670, after the second AI model processes the inputs-whether the user query or the semantically similar pre-generated question along with the associated data chunk the pipeline engine can receive the resulting output from the model. This output may consist of a refined response, an answer based on the content of the data chunk, or additional information synthesized by the AI model. Upon receiving the results, the pipeline engine can further process or format the response to ensure it aligns with the desired output for the end user.

At stage 680, the pipeline engine can transmit the results to the user device. The user device can then display the results to the user. This seamless interaction between the software engine and the second AI model ensures that the user receives contextually relevant and accurate information, whether the question was user-generated or selected from pre-generated queries.

The results caching and retrieval described with respect to FIG. 2 can also apply to FIG. 6 and the other examples discussed herein.

Figure 7:
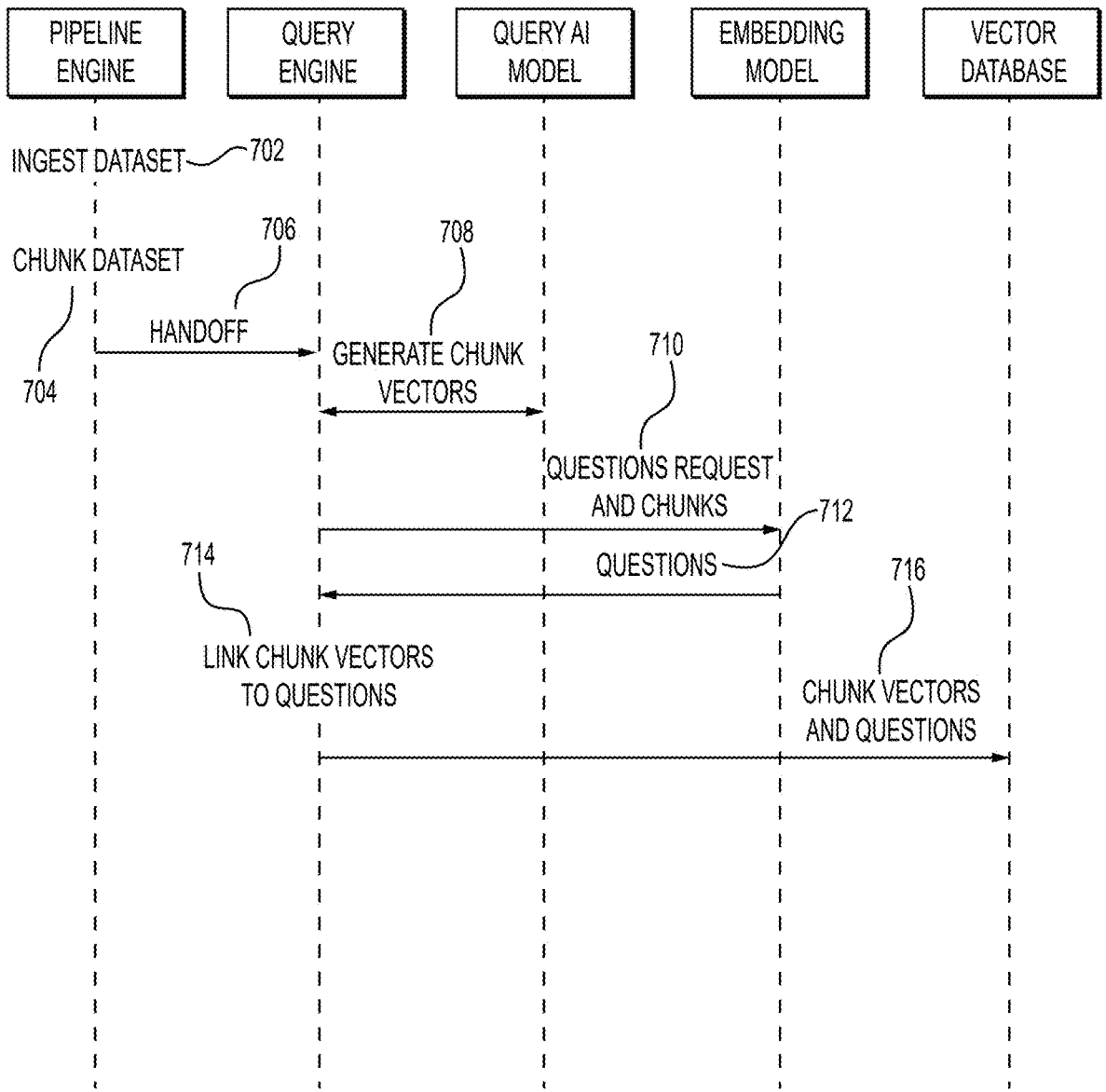
FIG. 7 is a sequence diagram of another example method for identifying and caching potential queries of an AI pipeline.

FIG. 7 is a sequence diagram of an example method for identifying and caching potential queries of an AI pipeline. At stage 702, a pipeline engine can ingest a dataset for an AI pipeline. This can occur when an AI pipeline is created or updated. A dataset can be added to an AI pipeline through several methods, utilizing different communication protocols to suit various system architectures. One common method is through direct upload via a REST API, where a client application sends the dataset to the AI pipeline's ingestion endpoint over HTTP or HTTPS. In this approach, the dataset can be submitted as a JSON or multipart/form-data payload, along with relevant metadata, such as its format or source. The API handles the upload, validates the dataset, and initiates its storage for further processing within the pipeline. Other methods that can be used include message queuing protocols, such as AMQP or MQTT, and FTP or SFTP.

Upon ingesting the dataset, the pipeline engine can initiate a multi-stage preprocessing workflow that structures the raw data for optimized interaction with the AI pipeline. Upon ingestion, the engine first parses the dataset, which may consist of structured, semi-structured, or unstructured data formats, such as text, images, or tabular information.

At stage 704, a pipeline engine can chunk the dataset. This can include segmenting the data into discrete, contextually meaningful units, or "chunks," based on predefined chunking parameters, such as token count thresholds or semantic boundaries.

At stage 706, the pipeline engine can signal the pipeline engine to take over by triggering a handoff mechanism. This can occur through an internal event, message, or API call. The pipeline engine's role ends after it preprocesses the data, dividing it into manageable chunks and storing them in the system along with relevant metadata. Upon receiving the signal, the pipeline engine activates and begins processing the newly created chunks.

At stage 708, the pipeline engine can generate vectors of the chunks. The vectorization process involves applying an embedding model, such as a pre-trained transformer-based model (e.g., BERT or GPT embeddings), which converts the textual questions into high-dimensional vector representations. The pipeline engine performs this operation for each chunk.

At stage 710, for each chunk, the pipeline engine can send, to a question generation AI model, a request for a set of anticipated questions a user may likely ask about the specific chunk. In the request, the pipeline engine can specify multiple personas, each corresponding to distinct user types, including, but not limited to, highly technical users (e.g., engineers), support-level users (e.g., customer service), and end users (e.g., general consumers). The inclusion of personas allows the question generation AI model to tailor its question generation based on the expected knowledge level, language style, and context relevant to each user type.

The question generation AI model processes this input by analyzing the semantic and structural properties of the data chunk and synthesizing a variety of questions specific to each persona. For a highly technical user, the question generation AI model may generate detailed, jargon-heavy questions that probe deep into the functionality or technical specifications outlined in the data chunk. In contrast, for a support-level user, the questions may focus on troubleshooting procedures or user-friendly explanations, while for end users, the question generation AI model may produce simpler, high-level questions that emphasize general functionality or practical application.

At stage 712, the question generation AI model can send the generated questions to the pipeline engine. These questions are transmitted in a structured format, such as a JSON file or an XML file.

At stage 714, the pipeline engine can link the chunk vectors to their corresponding questions. In one example, the pipeline engine can create a vector database entry for each data chunk vector, and each entry can include metadata with the chunked text and the pre-generated questions, such as that shown in TABLE 4. The pipeline engine can then save these in a vector database at stage 716.

Figure 8:
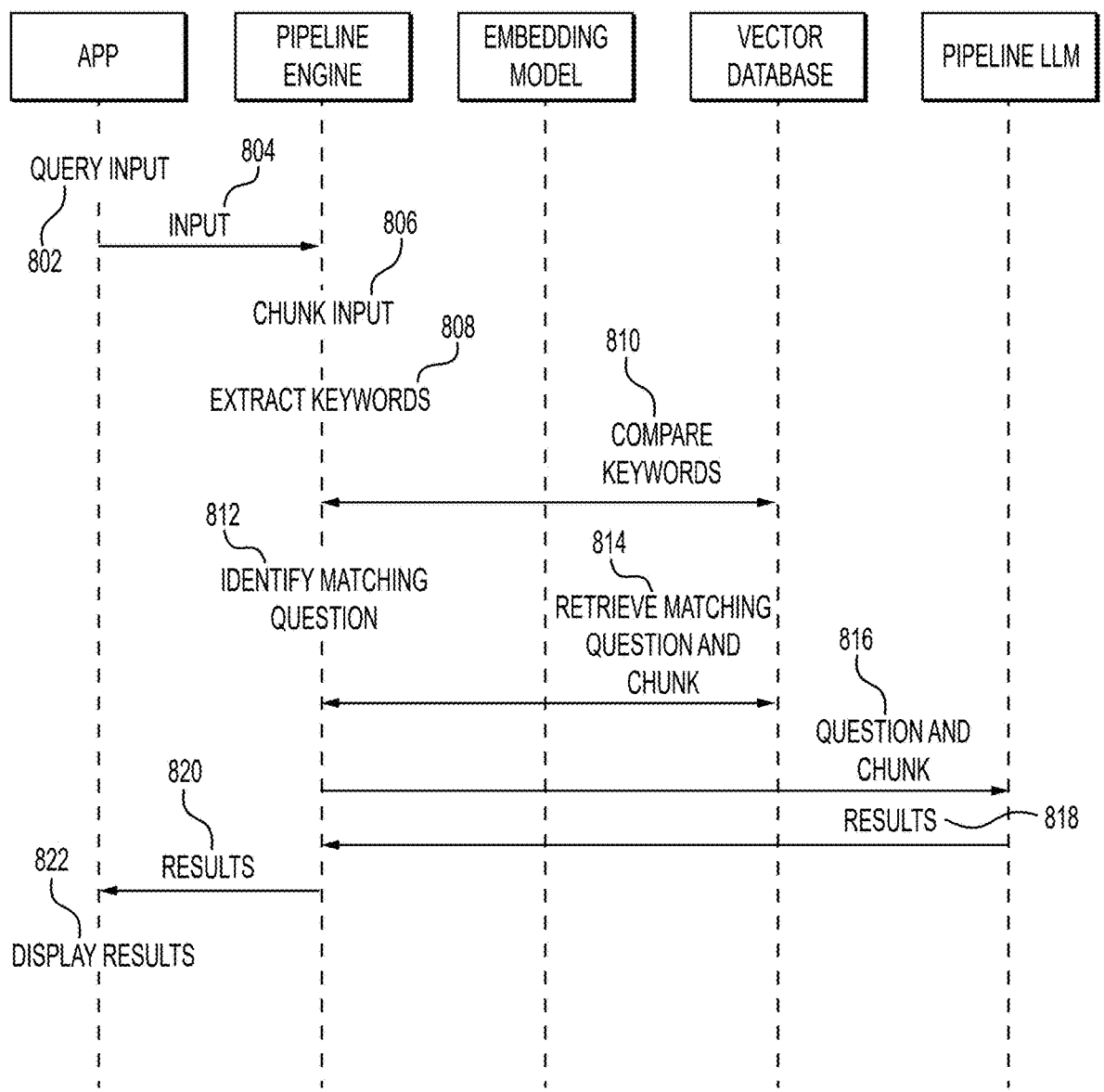
FIG. 8 is a sequence diagram of another example method for matching a query input to a pre-generated question for an AI pipeline.

FIG. 8 is a sequence diagram of another example method for matching a query input to a pre-generated question for an AI pipeline using keyword matching. This method can occur after the method of FIG. 7 above is completed. For example, before stage 802, questions that users may ask about each data chunk in a dataset have been pre-generated, vectorized, and stored in a vector database, along with metadata linking them to their corresponding data chunks.

At stage 802, a user can input a query into an application. The application can be front-end layer for interacting with AI pipelines. The application is designed to capture, process, and relay user queries.

At stage 804, the application can send the input to a pipeline engine. The application can send the input using any appropriate communication protocol, such as an API or HTTPS call. The input can include the user's request and any relevant metadata, such as information identifying the user, the user's profile, any groups the user is assigned to, and so on.

At stage 806, the pipeline engine can chunk the input. This can include segmenting the input into smaller, contextually relevant units. This chunking is based on predefined parameters, such as token limits or semantic boundaries, ensuring that each chunk retains coherence for further processing. The pipeline engine can apply natural language processing ("NLP") techniques to ensure that the segmentation maintains logical structure, allowing each chunk to represent a self-contained portion of the query, which can then be efficiently processed by downstream components, such as an AI model.

At stage 808, the pipeline engine can extract keywords from the input. For example, the pipeline engine can preprocess the query by performing tokenization to split the input into individual components, followed by normalization steps that convert all text to lowercase and remove common stop words. The pipeline engine can then employ stemming techniques to reduce words to their root forms. Finally, a scoring algorithm can be applied to rank the extracted keywords based on their relevance to the overall context of the user query. This refined set of keywords can then be utilized in subsequent stages of the AI pipeline, enhancing the system's capability for information retrieval, context recognition, and response generation.

At stage 810, the pipeline engine can compare the keywords with the pre-generated question in the vector database. This comparison process can leverage a combination of techniques, including exact keyword matching, fuzzy matching, and semantic analysis, to assess the degree of similarity between the user input and the stored questions. In one example, the pipeline engine can rank the stored questions to identify the most suitable match for the user query. This process not only enhances the accuracy of the matching but also improves the system's capability to understand user intent effectively.

At stage 812, the pipeline engine can identify a matching question. For example, the matching process can involve calculating a score for each question based on a scoring metric that considers several factors, including the number of keyword matches, the frequency of those keywords, and their proximity within the question. The pipeline engine can systematically count the total occurrences of each keyword from the user query within each stored question, assigning higher scores to questions with more substantial keyword overlap. Additionally, the scoring metric can incorporate penalties for irrelevant keywords or consider the context in which the keywords appear. Ultimately, the question that yields the highest score can be selected as the matching question, serving as the basis for generating a relevant response that closely aligns with the user's intent. This method ensures that the system not only finds a relevant question but also prioritizes the one that is most likely to provide an accurate and helpful answer.

At stage 814, once the closest matches are identified, the corresponding data chunks or responses can be retrieved for further processing, allowing the system to provide a contextually relevant answer to the user. The pipeline engine can use the metadata linked to the matching vector to locate the precise data chunk tied to that question. This retrieved data chunk contains the relevant information from the original dataset, which the pipeline engine can now pass along for further processing.

At stage 816, the pipeline engine can send the question and the chunk to the pipeline AI model. This can occur using an external API call, allowing the AI model to process the data in real time. The pipeline engine can be configured to send either the user's query or the matching question to the pipeline AI model. The pipeline engine formats the data according to the API requirements of the pipeline AI model, ensuring proper transmission of the question and the relevant chunk. The pipeline AI model, designed to handle a wide range of inputs, processes the question and data chunk to generate a detailed and contextually accurate response. At stage 818, the pipeline AI model can send the results to the pipeline engine.

At stage 820, the pipeline engine can send the results to the application. In an example, the pipeline engine can process the response to ensure it aligns with the application's format and user interface requirements. The pipeline engine then packages the response, including any relevant metadata or context, and sends it back to the application via a secure API or messaging protocol.

Once the application receives the results, at stage 822, it renders the response in a user-friendly format, making it easily accessible and understandable for the end user. This seamless flow between the pipeline engine, the third-party AI model, and the application ensures that the user receives accurate and contextually appropriate information in real time.

Figure 9:
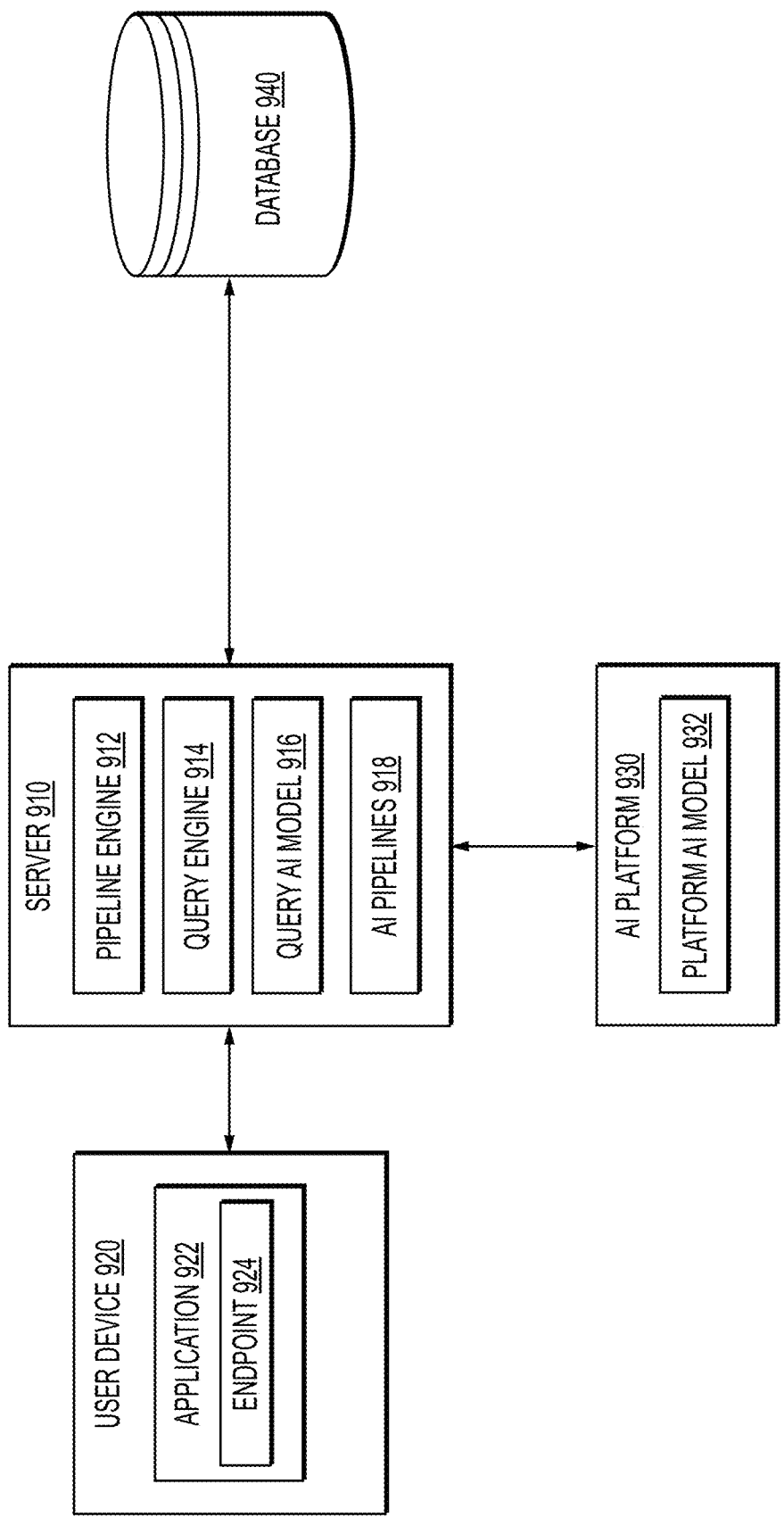
FIG. 9 is an example diagram of system components for identifying and caching potential queries of an AI pipeline.

FIG. 9 is an example diagram of system components for identifying and caching potential queries of an AI pipeline. The system comprises a server 910 that manages core data processing, a user device 920 for handling user interactions, and an external AI platform 930 that hosts an AI model 932 for advanced language processing. These components are designed to interact efficiently, ensuring seamless data flow, optimized query handling, and real-time user responses. The user device 920 can be one or more processor-based devices, such as a personal computer, tablet, or cell phone. The processor is hardware-based. The server 910 can be a single server or a group of servers, including multiple servers implemented virtually across multiple computing platforms.

When an AI pipeline is created, a dataset is uploaded to the server 910, which includes several key components to manage the ingestion and processing of the dataset. Either the pipeline engine 912 or the pipeline engine 914 is responsible for chunking the dataset into smaller, contextually relevant units. These chunks are created using a predefined chunking mechanism based on token limits or semantic boundaries, which ensures that each chunk represents a coherent segment of the dataset. Once the chunking process is complete, the pipeline engine 914 uses an embedding model to generate vector embeddings for each chunk, capturing the semantic meaning of the content. These vectors, along with their associated metadata, are stored in a database 940.

The pipeline engine 914 is responsible for generating questions that users might ask about each data chunk. To accomplish this, the pipeline engine 914 sends the chunked data to a query AI model 916, which is designed to generate a set of questions tailored to various user personas, such as technical users, support staff, or end users. The query AI model 916 processes each chunk and generates a variety of potential user questions, which are designed to anticipate the types of inquiries that may arise based on the content of the data. These generated questions are then stored in the database 940 alongside the corresponding data chunks, forming a repository of pre-generated questions that can be retrieved later during user interactions.

The system also incorporates an external AI platform 930, which hosts an AI model 932, such as CHATGPT, to further enhance the response generation process. The AI pipeline 918 component facilitates the flow of data between the server and the external AI platform 930. Once user queries are submitted, the application 922 interfaces with the AI pipeline 918 to initiate query handling. The pipeline engine 912 compares the user's query to the pre-generated question embeddings stored in the database and retrieves the most relevant question and corresponding data chunk. The pipeline engine then sends this information to the AI model 932 on the AI platform 930 for further processing. The AI model 932 generates a detailed response based on the pre-generated question and data chunk and returns the results to the server 910 for further formatting and transmission.

The database 940 can be one or more vector databases. In one example, the vectorized questions and their corresponding data chunks can be stored within the same database 940, with the data chunks being included as metadata associated with the questions. In another example, the vectorized questions and data chunks can be stored in separate vector databases 940, with a mapping between the two to ensure accurate association and retrieval.

The application 922 on the user device 920 serves as the user interface, allowing users to input queries and receive responses from the AI pipeline. User queries are sent to the server through an endpoint 924, which directs the queries into the pipeline for processing. Once the query has been matched with a pre-generated question and the corresponding data chunk has been processed by the external AI model 932, the final response is transmitted back to the user's application for display. This system architecture allows for seamless communication between the user device, server, and external AI model, ensuring optimized query handling and delivering contextually relevant responses to users based on pre-generated questions.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for processing user queries based on a dataset associated with an artificial intelligence ("AI") pipeline, comprising:
    generating chunks for content of the dataset based on an embedding model and chunking parameters;
    for each of a plurality of generated chunks,
        submitting, to a first AI model, a request to generate user questions to which the chunk would be responsive, the request including a prompt instructing the first AI model to create questions relating to each of a plurality of personas;
        receiving, from the first AI model, generated questions for the respective chunk;
        vectorizing the generated questions to create question vectors; and
        storing the question vectors in a first vector database, wherein the question vectors are stored with metadata linking the respective question vector to the respective chunk;
    receiving a user query, the user query originating from a user device;
    as part of determining which chunks are responsive to the user query, semantically comparing the user query to the generated questions, including:
        vectorizing the user query to create a query vector; and
        identifying a semantically similar question by comparing the query vector to the question vectors of the first vector database, wherein the semantically similar question corresponds to a question vector that meets a threshold similarity to the query vector;
    retrieving the chunk associated with the metadata of the semantically similar question;
    synthesizing a result that includes the retrieved chunk, wherein the result is transmitted back to the user device, wherein synthesizing the result comprises:
        submitting, to a second AI model, (1) the user query or the identified semantically similar question, and (2) the chunk associated with the identified semantically similar question; and
        receiving an output from the second AI model, wherein the transmitted result is displayed at the user device, wherein the result is based on the output, and wherein the threshold similarity includes a threshold distance or angle measurement to the question vector;
storing the result in association with metadata of the question vector;
receiving an AI pipeline input from a source device that is one of the user device or a different user device, wherein the AI pipeline input is a second user query;
vectorizing part of the AI pipeline input to create a second query vector;
identifying the question vector as meeting a threshold similarity to the second query vector;
retrieving the stored result using the metadata of the question vector; and
transmitting the stored result to the source device, bypassing submitting the stored result to the second AI model.

2. The method of claim 1, wherein the chunks are stored in a second vector database with each chunk having a chunk identifier, and wherein linking the plurality of questions to a corresponding chunk includes referencing the question vectors in the first vector database to respective chunk identifiers for respective corresponding chunks.

3. The method of claim 1, wherein the plurality of questions received from the first AI model includes questions relating to each of the plurality of personas.

4. The method of claim 3, wherein at least two of the plurality of personas correspond to different user roles, wherein a first user role is identified in association with the user device or the user query, wherein the first user role is used to identify the semantically similar question.

5. The method of claim 1, wherein identifying the semantically similar question includes:
generating, for multiple of the question vectors, a matching score;
comparing the matching scores to a threshold; and
identifying multiple questions, each corresponding to a question vector having a matching score that exceeds the threshold.

6. The method of claim 5, wherein identifying the semantically similar question further includes:
causing display of the multiple questions at the user device; and
receiving a selection of one of the multiple questions, wherein the selection is identified as the semantically similar question.

7. The method of claim 5, wherein identifying the semantically similar question further includes:
identifying a question of the multiple questions with a highest score; and
causing display of the question with the highest score at the user device.

8. A non-transitory, computer-readable medium containing instructions that, when executed by a hardware-based processor, causes the processor to perform stages for processing user queries based on a dataset associated with an artificial intelligence ("AI") pipeline, comprising:
generating chunks for content of the dataset based on an embedding model and chunking parameters;
for each of a plurality of generated chunks,
submitting, to a first AI model, a request to generate user questions to which the chunk would be responsive, the request including a prompt instructing the first AI model to create questions relating to each of a plurality of personas;
receiving, from the first AI model, generated questions for the respective chunk;
vectorizing the generated questions to create question vectors;
storing the question vectors in a first vector database, wherein the question vectors are stored with metadata linking the respective question vector to the respective chunk;
receiving a user query that originates at a user device;
as part of determining which chunks are responsive to the user query, semantically comparing the user query to the generated questions, including:
vectorizing the user query to create a query vector; and
identifying a semantically similar question by comparing the query vector to the question vectors of the first vector database, wherein the similar question corresponds to a question vector that is within a threshold distance or angle measurement to the query vector;
retrieving the chunk associated with the metadata of the similar question;
synthesizing a result that includes the retrieved chunk, wherein the result is transmitted back to the user device, wherein synthesizing the result comprises:
submitting, to a second AI model, (1) the user query or the identified semantically similar question and (2) the identified chunk associated with the identified semantically similar question; and
receiving an output from the second AI model;
transmitting the result to the user device for display, wherein the result is based on the output;
storing the result in association with metadata of the question vector;
receiving an AI pipeline input from the user device or a different user device, wherein the AI pipeline input is a second user query;
vectorizing part of the AI pipeline input to create a second query vector;
identifying the question vector as meeting a threshold similarity to the second query vector;
retrieving the stored result using the metadata of the question vector; and
transmitting the stored result to the user device or different user device, bypassing submitting the stored result to the second AI model.

9. The non-transitory, computer-readable medium of claim 8, wherein the chunks are stored in a second vector database with each chunk having a chunk identifier, and wherein linking the plurality of questions to a corresponding chunk includes referencing the question vectors in the first vector database to respective chunk identifiers for respective corresponding chunks.

10. The non-transitory, computer-readable medium of claim 8, wherein the plurality of questions received from the first AI model includes questions relating to each of the plurality of personas.

11. The non-transitory, computer-readable medium of claim 10, wherein at least two of the plurality of personas correspond to different user roles, wherein a first user role is identified in association with the user device or the user query, and wherein the first user role is used to identify the similar question.

12. The non-transitory, computer-readable medium of claim 8, wherein identifying the semantically similar question includes:
scoring a closeness of multiple of the question vectors to the query vector; and
identifying the question vector with a highest score as the semantically similar question.

13. The non-transitory, computer-readable medium of claim 8, wherein
identifying the semantically similar question includes:
generating, for multiple of the question vectors, a matching score;
comparing the matching scores to a threshold;
identifying multiple questions, each corresponding to a question vector having a matching score that exceeds the threshold;
causing display of the multiple questions at the user device; and
receiving a selection of one of the multiple questions,
wherein the selection is identified as the semantically similar question.

14. The non-transitory, computer-readable medium of claim 8, wherein
identifying the semantically similar question includes:
generating, for multiple of the question vectors, a matching score;
comparing the matching scores to a threshold;
identifying multiple questions, each corresponding to a question vector having a matching score that exceeds the threshold;
identifying a question of the multiple questions with a highest score; and
causing display of the question with the highest score at the user device.

15. A system for processing user queries based on a dataset associated with an artificial intelligence ("AI") pipeline, comprising:
a memory storage including a non-transitory, computer-readable medium comprising instructions; and
at least one hardware-based processor that executes the instructions to carry out stages comprising:
generating chunks for content of the dataset based on an embedding model and chunking parameters;
for each of a plurality of generated chunks,
causing to be submitted, to a first AI model, a request submitted to the first AI model includes one or more prompts instructing the first AI model to create questions relating to each of a plurality of personas;
receiving, from the first AI model, generated questions for the respective chunk;
causing vectorizing of the generated questions to create question vectors; and
causing storing of the question vectors in a first vector database, wherein the question vectors are stored with metadata linking the respective question vector to the respective chunk;
receiving, from a user device, a user query;
as part of determining which chunks are responsive to the user query, causing a semantic comparison of the user query to the generated questions, including:
causing vectorizing of the user query to create a query vector;
causing identifying of a semantically similar question by comparing the query vector to the question vectors of the first vector database, wherein the similar question corresponds to a question vector that is within a threshold similarity to the query vector; and
causing identifying the chunk associated with the metadata of the similar question;
causing submitting, to a second AI model, (1) the user query or the identified semantically similar question and (2) the identified chunk associated with the identified semantically similar question;
receiving results from the second AI model;
transmitting the results to the user device;
storing the result in association with metadata of the question vector;
receiving an AI pipeline input from the user device or a different user device, wherein the AI pipeline input is a second user query;
vectoring part of the AI pipeline input to create a second query vector;
identifying the question vector as meeting a threshold similarity to the second query vector;
retrieving the stored result using the metadata of the question vector; and
transmitting the stored result to the user device or different user device, bypassing submitting the stored result to the second AI model.

16. The system of claim 15, wherein the plurality of questions received from the first AI model includes questions relating to each of the plurality of personas, wherein at least two of the plurality of personas correspond to different user roles, wherein a first user role is identified in association with the user device or the user query, and wherein the first user role is used to identify the similar question.

* * * * *